Patented Oct. 13, 1925.

1,556,977

UNITED STATES PATENT OFFICE.

GASTON D. THÉVENOT, OF NEW YORK, N. Y.

METHOD FOR THE PREPARATION OF A VEGETABLE MILK.

No Drawing.   Application filed December 8, 1923.   Serial No. 679,472.

*To all whom it may concern:*

Be it known that I, GASTON D. THÉVENOT, a citizen of the United States, residing at New York city, New York, have invented a certain new and useful Improvement in Methods for the Preparation of a Vegetable Milk, of which the following is a clear, full, and exact description.

The present invention relates to the preparation of a milk substitute from soya beans, and more particularly to a method of preparing a substitute milk powder in which the fats originally present in the beans will be retained, and which may be preserved indefinitely without substantial change in the product.

In the preparation of soya beans by the methods heretofore employed, the fats have either been entirely eliminated from the product or else have been retained therein in a form in which they become rancid and give a disagreeable and undesirable flavor to the product.

It is the primary object of the present invention to provide a method of treating soya beans whereby a product may be obtained in which the fats originally present in the beans are retained in the product, and in which the method is carried on in such a manner that the fats will not become rancid in the product even after long standing.

Another object of the invention is to provide a method for preparing soya bean milk by means of which the product may be prepared at a low cost and in which the food values of the soya beans are substantially completely retained.

With these and other objects in view, the invention comprises the following features hereinafter described and defined in the claims.

In preparing the substitute milk product by my process, I first grind the beans, by means of any suitable apparatus therefor, to attain a coarsely ground material from which the husks may be readily removed as, for example, by means of a current of air sufficiently strong to carry off the light husks while leaving the heavier particles of the bean behind.

The coarsely ground or crushed material from which the husk has been removed is then treated in order to remove coloring matter and other substances of an objectionable nature therefrom. I preferably soak the beans in a solution comprising equal parts of grain alcohol and water for a time sufficient to dissolve the coloring matter and other constituents which would give an objectionable flavor or taste to the product. In place of grain alcohol to dissolve the coloring matter etc., wood alcohol, acetone, benzine, carbon-tetrachloride, or other suitable solvent might be employed. I have found, however, that a solvent which is miscible with water, such as grain alcohol, wood alcohol or acetone is most suitable for the purpose. By the use of one of these solvents a single extraction may be employed to remove the undesirable constituents in place of a series of separate extractions, which would be necessitated by the use of solvents immiscible with water. I have found that the best results are obtained by treating the material for a period of from two to twenty four hours in contact with the solvent liquid at substantially room temperature. It is to be understood, however, that the length of treatment may be varied to suit the conditions and that the time of treatment may be extended or decreased if desired. The solvent may, if desired, be heated and the extraction may be carried on at any elevated temperature at which no deleterious chemical changes take place. I may employ temperatures up to approximately 140° F. for example.

After the various constituents to be removed have been sufficiently extracted from the beans, the solvent is drawn off as completely as possible and the residual solvent adhering to or absorbed in the beans is removed by blowing air through the mass or by applying heat thereto, or by simultaneously applying heat and air, in any preferred manner. In order to prevent chemical changes from taking place in the material, a low temperature should be employed in the blowing or the heating operation. By limiting the temperature to 140° F., it is found that discoloration of the material and decomposition of the protein content may be entirely avoided. Any suitable drying apparatus may be employed for carrying out the drying step, but I preferably employ an apparatus which permits of the recovery of the solvent during the drying process, such as a rotary vacuum drier, for example.

After the solvent has been removed in the manner above described, the dry product which is of a creamy white color and free from disagreeable taste or flavor, is ground to a fine powder, preferably of the consistency of wheat flour, by means of any suitable grinding apparatus. After the last grinding operation is completed, or, if desired, during the grinding operation, suitable amounts of sugar, as sucrose, dextrose or maltose, are added to the mass to attain the desired sugar content. Suitable salts or mineral matter such as lime salts, sodium salts or ammonia salts may also be added to the product in any suitable proportions to give the product the desired flavor or composition. The mineral matter particularly the ammonia salts serves, when the milk powder is used for baking purposes, as a yeast food and thereby assists in the fermentation process by which the dough mixture is raised. It may be desirable in the preparation of my substitute milk powder, particularly when it is to be used solely for baking purposes, to omit entirely the addition of mineral matter to the product. The desired amount of mineral matter, or yeast food other than sugars, may then be introduced into the dough mixture during the mixing or kneading process, either in the form of dry salts, or in the form of a solution of the salts in water. By the addition of mineral matter, required for the baking mixture, during the kneading operation, the step of intimately mixing the mineral matter with the substitute milk powder may be wholly avoided, thus effecting economy in both time and labor in the preparation of the milk powder for the baking operation.

The proportions which I preferably employ in the milk powder and which I have found most suitable are approximately 100 parts of the pulverized beans, 50 parts of sugar, and 5 parts of mineral matter. The above proportions are particularly suitable for a substitute milk powder to be employed in baking and for other purposes, in that the composition is substantially identical with milk powder obtained from cow's milk. It is to be understood, however, that the proportions may be varied to suit the needs or the uses to which it is put.

If the material is to be used solely for baking, the mineral salts may be entirely omitted, as above set forth, but for ordinary purposes the mineral salts are added in amounts varying from 3 to 8 per cent in the final product. The amount of sugars employed in the mixture may also vary, although I prefer to limit the percentage in the final product to amounts between 30 and 40 per cent. The percentage of fats in the substitute milk powder will vary, depending upon the amount originally present in the beans, but by the use of my process as above described I retain in the product substantially all the fats originally present in the soya beans, which will vary in the final product between 8 and 18 per cent. I have found that by the use of this process the fats which are retained in the product have apparently no tendency to become rancid. This, I believe is due to the fact that the spraying operation generally employed in preparing a milk substitute is wholly avoided and which, I believe, is responsible for chemical changes which take place in the fatty constituents which necessitates their removal in order to prevent rancidity in the product.

It is to be understood that various changes or modifications may be made in the process as above set forth, as will be apparent to those skilled in the art, without departing from the spirit or scope of the invention as defined in the claims.

Having thus described the invention, what is claimed as new is:

1. A process of preparing a milk substitute from soya beans which comprises grinding the beans, removing the husks from the ground product, soaking the beans in a solvent comprising substantially equal parts of alcohol and water, drying the product at a low temperature to remove the solvent therefrom, thereafter pulverizing the mass and adding sugar and mineral matter thereto in proportions to attain a milk powder having substantially the composition of that derived from cows' milk.

2. A process of preparing a substitute milk powder from soya beans which comprises grinding the beans, soaking the beans in a solvent comprising alcohol and water to remove coloring matter and other deleterious constituents therefrom without removal of constituent fats, drying the product at a low temperature to remove remaining solvent, and thereafter grinding the mass to a fine powder, and mixing sugars and mineral salts therewith in suitable proportions.

3. A process of preparing a substitute milk powder from soya beans which comprises grinding the beans, soaking the beans in a water soluble solvent and water in suitable proportions to remove undesirable constituents therefrom, without removing constituent fats, removing the solvent from the mass, drying the mass, and thereafter reducing the mass to a suitable fineness to which sugar and other desired constituents may be added to attain a composition substantially that of milk powder derived from cows' milk.

4. A process of preparing a substitute milk powder from soya beans which comprises separating the husks from the beans, soaking the beans in a solvent liquid comprising water and a water soluble solvent to remove coloring matter and undesired constituents without removing the constituent fats therefrom, separating the solvent liquid from the mass, drying the mass, and thereafter comminuting the mass to attain a suitable fineness.

5. A process of preparing a substitute milk powder from soya beans which comprises grinding the beans, removing the husks therefrom by means of a current of air, soaking the ground beans in a solvent liquid comprising substantially equal proportions of grain alcohol and water to remove coloring matter and other undesired constituents therefrom without removing substantial amounts of constituent fats therefrom, separating the main portion of solvent from the mass, heating the mass under reduced pressure to separate the residual solvent therefrom without decomposition of constituent protein material therein, thereafter grinding the mass to a fineness suitable for forming a suspension of the mass in water, and finally mixing sugars and mineral matter to the powder to attain the desired composition.

Signed at New York city, New York, this 7th day of December, 1923.

GASTON D. THÉVENOT.